United States Patent [19]

Hajjar et al.

[11] Patent Number: 5,675,568
[45] Date of Patent: Oct. 7, 1997

[54] LASER POWER CONTROL IN AN OPTICAL RECORDING SYSTEM TO COMPENSATE FOR VARIATIONS IN MARK LENGTH RESULTING FROM A WOBBLED GROOVE

[75] Inventors: Roger A. Hajjar; James Eugene Durnin, both of Fairport; Clarke K. Eastman, Rochester, all of N.Y.

[73] Assignee: Eastman Kodak Company, Rochester, N.Y.

[21] Appl. No.: 586,082

[22] Filed: Jan. 16, 1996

[51] Int. Cl.$^6$ ............................................. G11B 7/00
[52] U.S. Cl. ...................... 369/116; 369/48; 369/54; 369/124
[58] Field of Search ..................... 369/116, 275.3, 369/275.1, 44.13, 47, 58, 124, 54, 48

[56] References Cited

U.S. PATENT DOCUMENTS

| 5,043,971 | 8/1991 | Van et al. | 369/124 |
|---|---|---|---|
| 5,088,080 | 2/1992 | Ishibashi et al. | 369/48 |
| 5,241,524 | 8/1993 | Lee | 369/54 |
| 5,315,572 | 5/1994 | Akatsuka et al. | 369/54 |
| 5,339,301 | 8/1994 | Raaymakers et al. | 369/50 |
| 5,363,360 | 11/1994 | Fairchild | 369/48 |
| 5,406,540 | 4/1995 | Longman et al. | 369/116 |
| 5,436,880 | 7/1995 | Eastman et al. | 369/48 |
| 5,440,534 | 8/1995 | Eastman et al. | 369/54 |
| 5,446,716 | 8/1995 | Eastman et al. | 369/54 |
| 5,463,614 | 10/1995 | Morita | 369/275.4 |
| 5,495,466 | 2/1996 | Dohmeier et al. | 369/275.4 |
| 5,537,373 | 7/1996 | Horikiri | 369/44.13 |

FOREIGN PATENT DOCUMENTS

| 2-158918 | 6/1990 | Japan | G11B 7/00 |
|---|---|---|---|
| 6-215376 | 8/1994 | Japan | G11B 7/00 |

*Primary Examiner*—Georgia Y. Epps
*Assistant Examiner*—Kim-Kwok Chu
*Attorney, Agent, or Firm*—Raymond L. Owens

[57] ABSTRACT

An apparatus and method for controlling laser power in an optical recording system in the presence of mark length variations produced by a groove wobble when an incident recording beam is off-track. An optical source supplies an incident write signal to an optical medium, such that data may be recorded on the medium during an incident write pulse as an optically-detectable mark. A reflection of the incident write signal from the medium is detected to provide a reflected write signal. A mark formation effectiveness (MFE) signal is generated from the reflected write signal to provide an indication of mark formation. A feedback circuit connected between the signal generator and the optical source controls a power level of the source in accordance with MFE signal variations produced by the wobbled groove.

14 Claims, 7 Drawing Sheets

LASER POWER CONTROL IN AN OPTICAL RECORDING SYSTEM TO COMPENSATE FOR VARIATIONS IN MARK LENGTH RESULTING FROM A WOBBLED GROOVE

CROSS-REFERENCE TO RELATED APPLICATION

The present invention is related to commonly-assigned U.S. patent application Ser. No. 08/584,933 entitled "Dynamic Tracking Control in an Optical Recording System by Sensing Mark Formation," filed Jan. 16, 1996 by Eastman et al the disclosure of which is incorporated herein by reference.

FIELD OF THE INVENTION

The present invention relates to optical data recording. More particularly, the present invention relates to improved optical recording in which mark length variations are compensated by using a reflected optical write signal to control optical source power.

BACKGROUND OF THE INVENTION

In optical data recording, an optical source, typically a laser or laser diode, generates an incident write signal in the form of a radiation beam. The beam is applied to an optical medium to record data thereon as optically-detectable marks. To facilitate proper application of the beam to the medium, certain types of media, such as compact disk recordable (CD-R) media, include a preformed spiral tracking structure typically referred to as a groove or pregroove. The dimensions and shape of the groove can vary depending upon the medium, but a typical groove width is on the order of 0.4 mm in the radial direction of the disk, with adjacent grooves in the spiral separated by about 1.6 mm in the radial direction. In CD-R media, the groove corresponds to a data track on which marks are recorded.

A well-known technique for ascertaining disk velocity and beam position in a disk-based system involves "wobbling" the spiral groove in the radial direction about an average groove centerline. The deviation of the wobbled groove from the centerline is referred to as the wobble amplitude. When a wobbled-groove disk is rotated at, for example, a constant linear velocity of 1.4 meters/second, the wobble amplitude variation will modulate a tracking signal at a predetermined frequency. For CD-R media in systems operating at a write speed of 1× or 4.32 Mbits/sec, the wobble frequency is 22.05 kHz. The wobble frequency is scaled upward for systems operating at higher speeds such that, for example, a system operating at 6× will have a wobble frequency of about 132.30 kHz. A servo loop can then provide the desired disk velocity by controlling the disk motor speed to maintain the tracking signal modulation signal at the wobble frequency.

The beam position on the surface of a wobbled-groove disk may be provided by frequency-modulating the wobble. The modulation of the tracking signal will then vary about the predetermined frequency in accordance with the frequency-modulation of the wobble frequency. In CD-R systems, the frequency modulation of the groove wobble is on the order of plus and minus five percent. The information frequency-modulated onto the groove wobble is often referred to as absolute-time-in-pregroove (ATIP) information. The ATIP information typically includes binary data indicating the amount of time the beam would have spent in the spiral groove to reach a given position on the disk surface by following the groove from its beginning at the inner disk diameter. The time may be represented in minutes, seconds and frames, with a frame corresponding to, for example, 1/75 of a second. The ATIP modulation may also include other information such as a disk identifier, synchronization marks and the expected optimum recording power. ATIP is described in greater detail in U.S. Pat. No. 5,363,360, which is assigned to the present assignee and incorporated herein by reference.

FIG. 1 illustrates a significant mark length variation problem which may arise when a wobbled groove is used on a recordable medium such as a CD-R disk. A portion of a wobbled groove G is shown illuminated by a spot S1 of an optical recording beam. The view shown is looking down on the disk in a direction normal to its laser-incident surface. The disk which includes the data track corresponding to groove G is rotated past the stationary beam at a desired velocity, such that S1 moves relative to the disk in the direction indicated. It should be noted that the amount of groove wobble is exaggerated in FIG. 1 for illustrative purposes. The wobble amplitude for CD-R media is typically on the order of 60 nm peak-to-peak, while the width of the groove G is on the order of 0.4 mm. Marks M1, M2 and M3 have been formed by spot S1 in a data track defined by the groove G. The spot S1 generally has a gaussian power distribution and is therefore shown in FIG. 1 as a number of concentric circles, in which a closer spacing of circles indicates a higher incident power level. The spot S1 generally has a width of greater than 0.5 mm but less than 2.0 mm, but can of course vary depending upon the application.

The mark length variation problem occurs when the radiation beam producing spot S1 is off-track in either direction of the groove centerline CL. Generally, proper mark length formation will require that the spot S1 be substantially centered about the centerline CL of the groove G. The spot S1 in FIG. 1, however, is off-track in a radial direction below the groove centerline. As a result of the groove wobble, the portion of S1 incident on the track, and therefore its intensity level, will vary. Nominal marks M1 of a desired length L are created when S1 is over the track defined by the groove for the proper amount of time and at the proper intensity. At the "peaks" of groove G in FIG. 1, a less intense portion of S1 illuminates the track, and for a shorter period of time, resulting in a shorter mark M2 with a length less than L. At the "troughs" of groove G, a more intense portion of S1 illuminates the track, and for a longer period of time, resulting in a longer mark M3 with a length greater than L.

FIGS. 2(a) and 2(b) plot the variation in mark length and land length, respectively, as a function of time for different track offsets. The variation in mark length is generally a function of the wobble frequency as shown in FIG. 2(a). The mark length variation which results when the spot is shifted in one direction relative to the centerline by 75 nm is reversed in sign when the spot is moved off-track in the opposite direction by 75 nm. FIG. 2(b) shows that land length variation exhibits the expected complementary response. When the recorded marks are subsequently read back, the mark length variation exhibited in FIGS. 1 and 2(a) causes jitter in the resulting data signal, thereby significantly degrading overall system performance.

A possible approach to alleviating the above-described mark length variation problem is to use a tracking servo to maintain the radiation beam spot on-track, that is, centered about the centerline of the wobbled groove. One such technique is described in detail in the above-cited U.S. patent application Ser. No. 08/584,933 entitled "Dynamic Tracking Control in an Optical Recording System by Sensing Mark Formation." However, certain types of system degradations, such as shock and vibration, create rapid variations in track offset which are difficult to control using tracking servo techniques.

Prior art laser power control techniques are not well-suited for correcting the mark length variation problem, because the wobble-induced variations are generally at a frequency outside the bandwidth of the typical power control servo. Many prior art laser power control techniques are primarily directed to correcting degradations due to defects such as scratches and contamination on the laser-incident polycarbonate substrate surface of, for example, a CD-R disk. The frequency content of such degradations is well below the wobble frequency of the groove due to the out-of-focus nature of the recording spot at the laser-incident surface of the substrate. Other laser power control techniques are based on measuring reflected signals for the longest recorded marks in the CD-R system, that is, marks of length 11T. However, these marks are only guaranteed to occur once in each data block, and there are 7,350 blocks per second at a write speed of 1×. This 11T power control technique would therefore be unable to track variations at the 1× wobble frequency of 22.05 kHz.

As is apparent from the above, a need exists for a technique for reducing mark length variations resulting from off-track recording on a wobbled-groove optical medium.

SUMMARY OF THE INVENTION

The present invention provides an apparatus and method for controlling laser power in an optical recording system to correct for mark length variations which result when an incident recording beam goes off-track relative to a wobbled-groove on an optical medium. The laser power control utilizes a mark formation effectiveness (MFE) signal in a servo loop to adjust the laser power such that mark length variations resulting from groove wobble are significantly reduced.

In accordance with the present invention, an apparatus and method are provided in which an optical source supplies an incident write signal to an optical medium, such that data may be recorded on the medium during an incident write pulse as an optically-detectable mark A reflection of the incident write signal from the medium is detected and used to generate a reflected write signal. A mark formation effectiveness (MFE) signal is generated from the reflected write signal to provide an indication of mark formation. A feedback circuit connected between the signal generator and the optical source controls a power level of the source in accordance with MFE signal variations produced by the wobbled groove.

One embodiment of the invention utilizes a single MFE signal generator and separate signal processing paths in the feedback circuit for low frequency components and wobble frequency components of the MFE signal. The low frequency components include MFE signal variations resulting from system degradations such as defocus, tilt and surface variations on the medium. The wobble frequency components include the fundamental groove wobble frequency as well as any modulation thereon. The signal processing path for the low frequency components may include a low pass filter and a signal combiner for generating an MFE error signal by comparing the MFE signal with a previously-stored target value. The signal processing path for the wobble frequency components may include a band pass filter centered at the wobble frequency as well as amplitude and phase adjustment elements. The separate processing paths are recombined in the feedback circuit and then passed through a variable gain stage to set an appropriate loop gain.

Another embodiment of the invention utilizes separate MFE signal generators for the low frequency and wobble frequency components of the MFE signals. The wobble frequency components of a first MFE signal from one generator are processed in a band pass filter and phase and gain adjustment elements. The low frequency components of a second MFE signal are processed in a low pass filter and signal combiner to generate an MFE error signal. Variable loop gains are then set separately for each of the MFE signal paths. The resulting components are then combined and utilized to control source power level.

In a further embodiment, a single MFE signal is used with a common feedback signal path for both low frequency and wobbled frequency MFE components. The MFE signal generator and feedback path are configured to generate substantially no amplitude or phase variations between the low frequency range and the wobble frequency range.

The present invention controls laser power to compensate for mark length variations resulting from groove wobble, while also providing compensation for source power variations introduced by system degradations such as defocus and tilt. The invention may also be utilized to compensate for mark length variations arising from other periodic diffracting structures or optically-detectable tracking elements arranged on an optical medium.

Further features of the invention, its nature and various advantages will become more apparent from the accompanying drawings and following detailed description of the invention.

DETAILED DESCRIPTION OF THE PREFERRED EMBODIMENTS

As noted above, data is generally recorded on an optical medium, such as a compact disk recordable (CD-R) medium, in the form of marks. A mark has a different reflectivity than the marked portions of the disk, or lands, and is formed using an incident write signal power level sufficient to alter the reflectivity of the medium. The marks and lands typically represent different binary logic levels within the recording data. In general, a reflected write signal can be used to indicate whether or not the corresponding marks have been properly formed by the incident write signal, or, in other words, whether the data has been properly recorded on the medium. The reflected write signal can therefore be used to determine if, for example, the laser write power level needs to be adjusted.

Systems which monitor the reflected write signal in this manner are often referred to as direct-read-during-write (DRDW) systems. Characteristics of the reflected write signal which may be monitored include, for example, the reflected signal peak voltage level or amplitude rate of change. These reflected signal characteristics, as well as any estimates or transformations thereof, will be generally referred to herein as mark formation effectiveness (MFE) signals. Additional detail regarding MFE signals generally and use of MFE signals in laser power control can be found in U.S. patent application Ser. No. 08/179,472, now U.S. Pat. No. 5,495,466 and U.S. Pat. Nos. 5,436,880 and 5,446,716, all of which are assigned to the assignee of the present invention, and incorporated herein by reference.

Figure 3A:
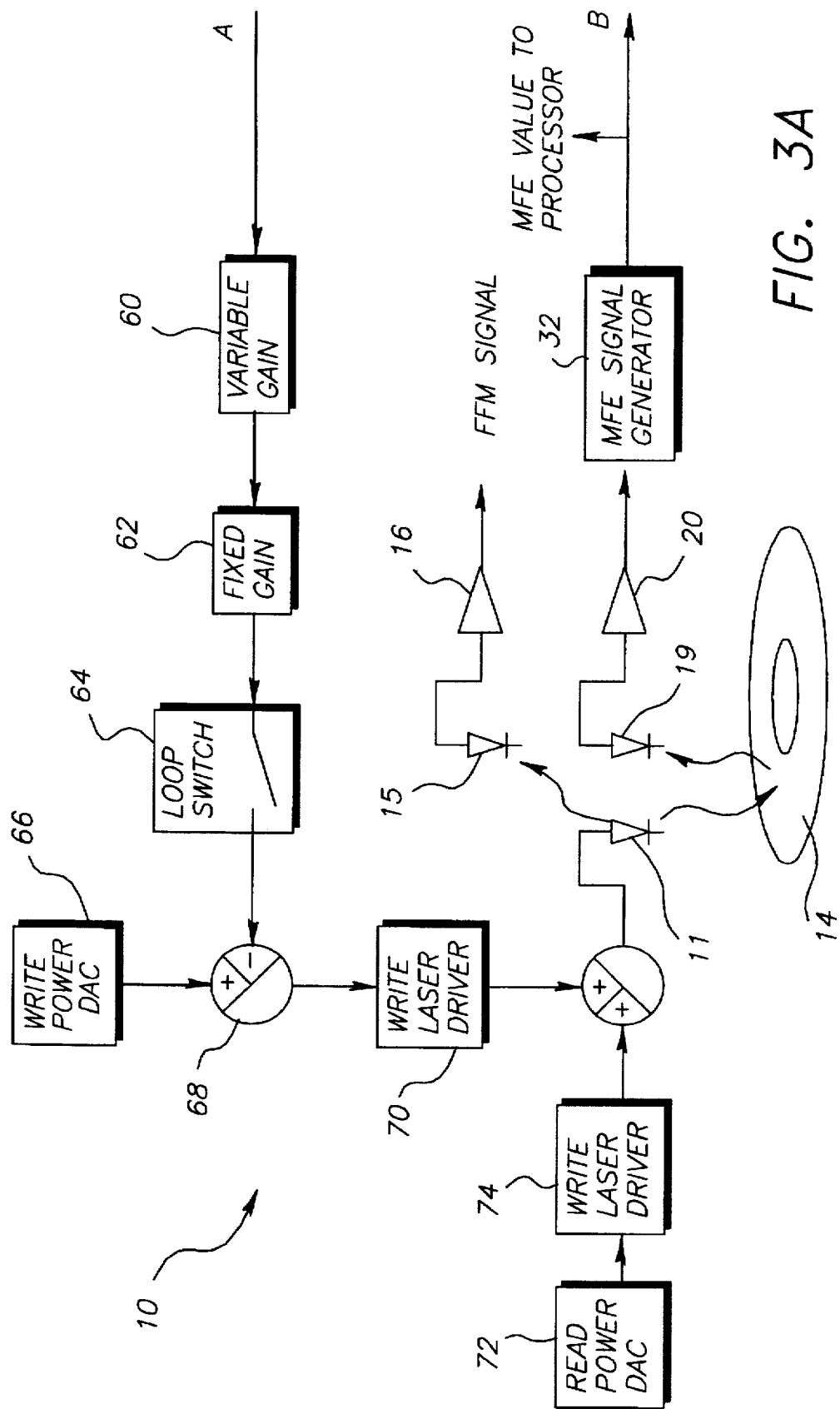
FIGS. 3(a) and 3(b), when taken together are a block diagram of a first embodiment of the present invention in which a single MFE signal generator is used for both wobble frequency laser power control and low frequency laser power control.
Figure 3B:
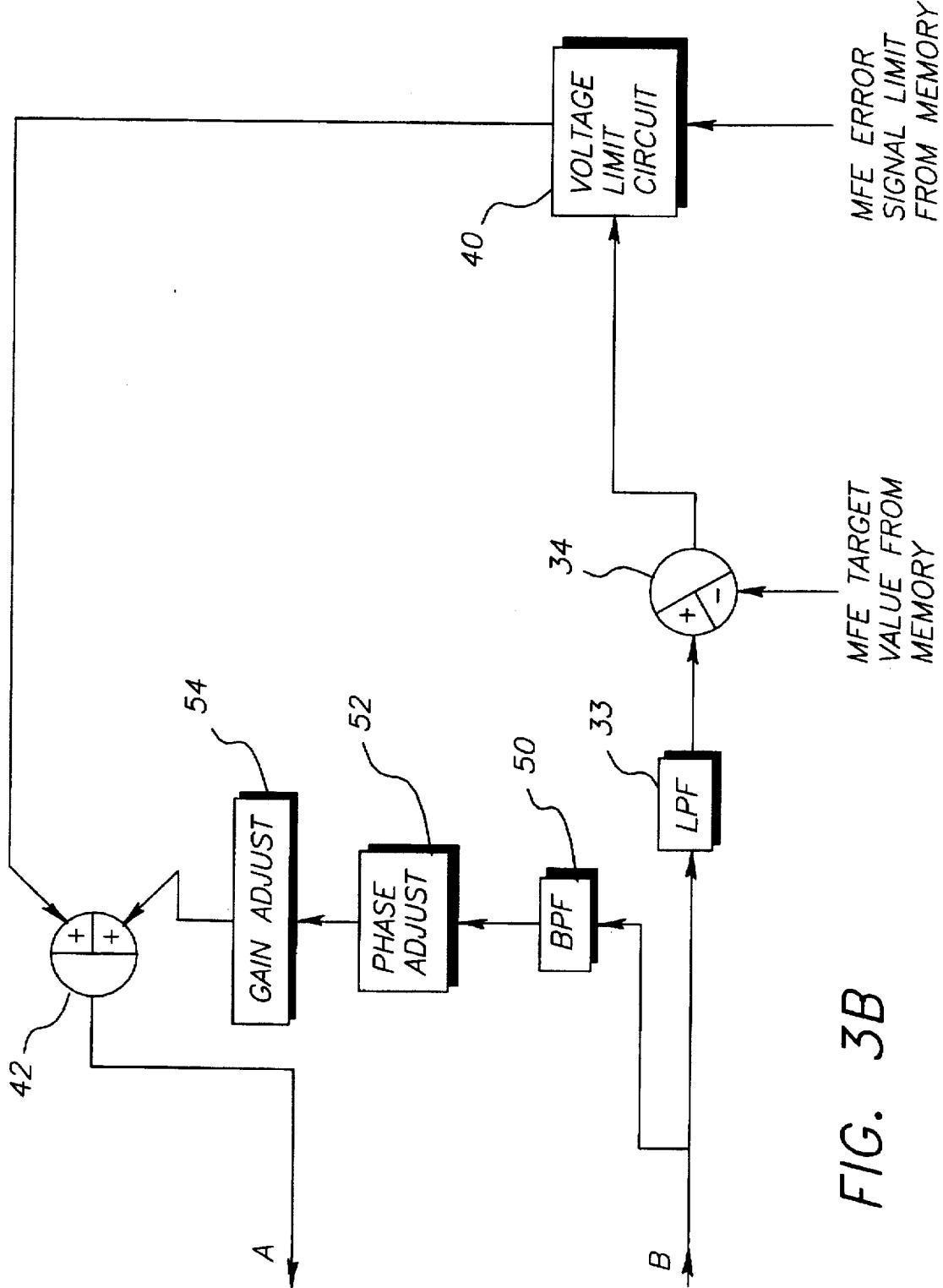

FIGS. 3(a) and 3(b), when taken together are a block diagram of an exemplary optical recording system 10 in accordance with the present invention. The recording system 10 includes an optical source 11 for generating an incident optical write signal used to record data on an optical recording medium 14. The optical source 11 may be, for example, a laser, laser diode or LED and may also incorporate a suitable controller. Although source 11 will be referred to herein simply as a laser, it should be understood that the present invention may be utilized with many other types of optical sources.

The optical source 11 is intensity-modulated by a stream of recording data, such as digital audio, video or other information, suitably encoded to facilitate recording on the optical medium. A data source (not shown) supplies the encoded recording data, generally in the form of a stream of pulses, to optical source 11. An exemplary data encoding technique well-known in the art is the eight-to-fourteen bit modulation (EFM) code typically used in CD-R recording. The incident optical signal typically includes a series of incident write pulses, each corresponding to a portion of the recording data. Although the remainder of the description will assume that optical medium 14 is a CD-R disk with a wobbled groove, it will be apparent that the invention is more broadly applicable to any recordable medium which includes a periodic diffracting structure. The term "wobbled groove" as used herein should therefore be understood to include alternative periodic diffracting structures as well as other optically-detectable tracking elements arranged on an optical medium.

A portion of the incident write signal is supplied directly from optical source 11 to a front facet monitor (FFM) 15. The FFM 15 is an optical detector which monitors the incident write signal power level. The FFM 15 provides via a preamplifier 16 an output signal which varies with the output power of the optical source. The FFM output signal from preamplifier 16 may be sampled between write pulses in a recording system processor (not shown), and used, for example, to control a read power level. The FFM signal may also be used to calibrate the optical source output power level as a function of its input drive, as described in the above-cited U.S. Pat. No. 5,436,880.

The portion of the optical write signal incident on optical medium 14 is reflected back from the medium 14 toward an optical detector 19. For clarity of illustration, well-known beam directing elements typically found in the optical signal path between source 11 and detector 19 have been omitted from FIGS. 3(a) and (b). The reflected optical write signal may also be directed to additional optical detectors (not shown), which may drive, for example, conventional focus or tracking servos. The optical detector 19 includes one or more photodetectors for detecting the reflected optical signal and generating electrical signals therefrom in a known manner. Exemplary photodetectors suitable for use in the present invention include positive-intrinsic-negative (PIN) photodiodes and avalanche photodiodes. In systems operating at high write speeds, such as 6× or higher, the photodetectors may require response times on the order of several nanoseconds. As noted above, a system write speed of 6× corresponds to six times the standard 4.32 Mbits/sec playback speed for a 1× audio CD.

The electrical signal at the output of optical detector 19 generally tracks the intensity modulation of the reflected optical write signal. The electrical signal from optical detector 19 represents a reflected write signal which is supplied to subsequent electronic processing circuitry via a preamplifier 20. The term "reflected write signal" as used herein will generally refer to the electrical signal at the output of the optical detector 19, rather than the optical signal at the detector input. The reflected write signal includes at least one reflected write pulse, corresponding to an incident pulse in the incident optical write signal.

A mark formation effectiveness (MFE) signal generator 32 receives the reflected write signal from the optical detector 19 via the preamplifier 20, and generates MFE signals indicative of mark formation quality. An exemplary MFE signal generator, which generates an estimate of the reflected write pulse normalized amplitude rate of change, is described in the above-cited U.S. patent application Ser. No. 08/179,472. The term "amplitude rate of change" refers generally to the change in reflected write pulse voltage, current or power as a function of time. The term "decay rate" refers to a particular type of amplitude rate of change, characteristic of "burn-dark" optical media such as CD-R, in which the reflected write pulse amplitude decays from an initial peak value to a steady-state plateau value during mark formation. It should be noted that the reflected pulse amplitude rate of change is only one type of reflected signal characteristic which may be used as an MFE signal to control laser power in accordance with the present invention.

Figure 1:
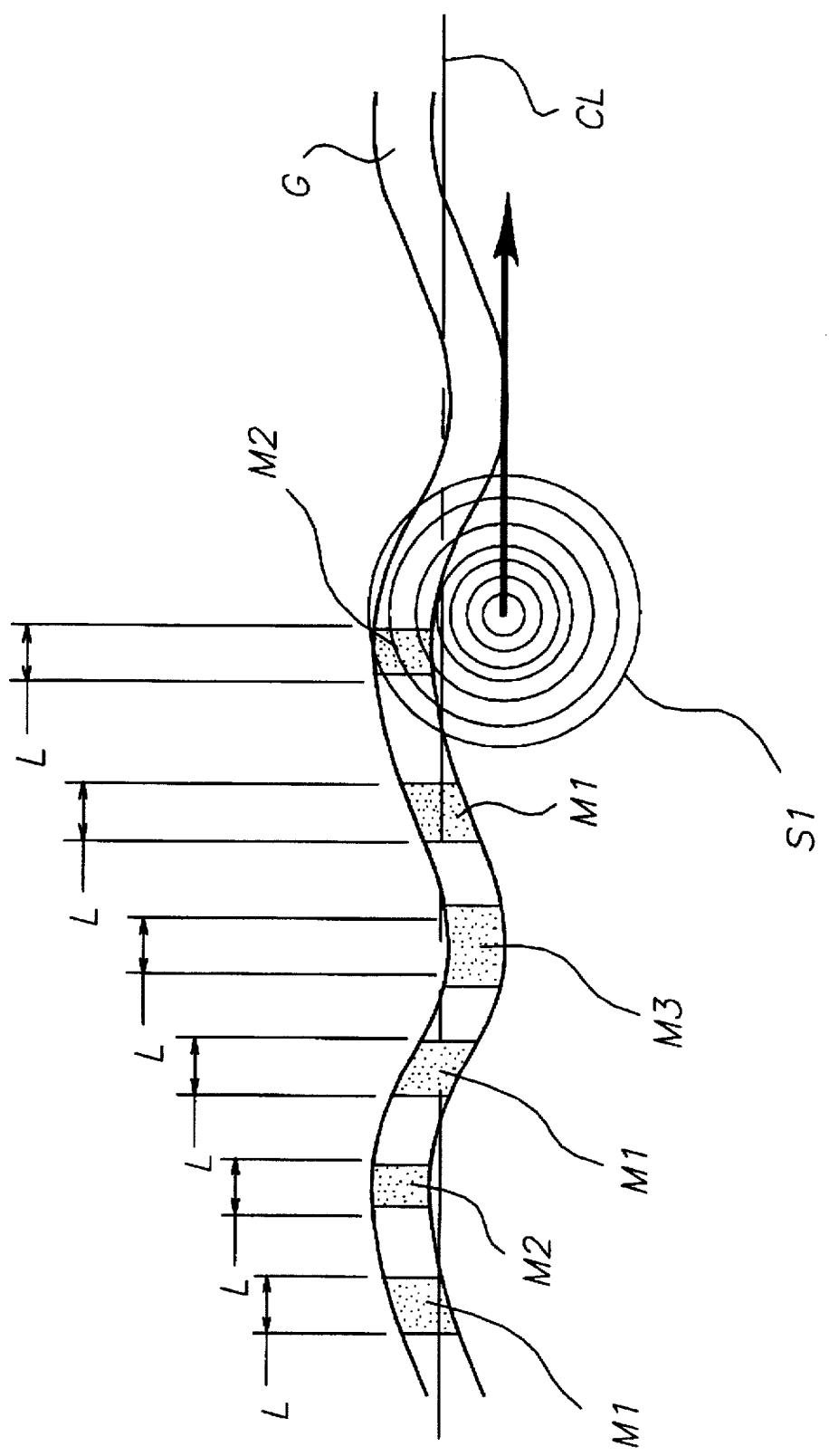
FIG. 1 illustrates wobble-induced variation in mark length resulting from an off-track recording spot on an exemplary portion of a prior art optical recording medium.
Figure 2A:
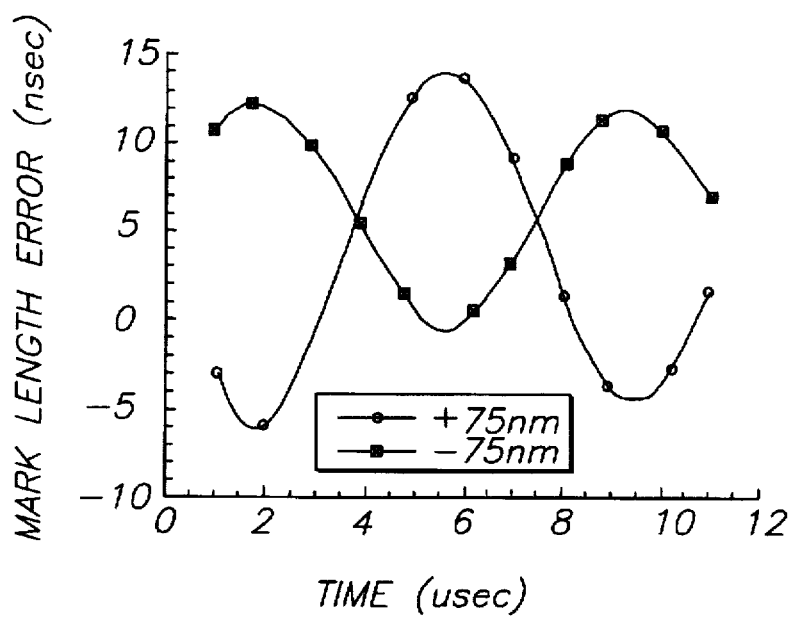
FIGS. 2(a) and 2(b) are plots of mark length variation and land length variation, respectively, for different track offsets.
Figure 2B:
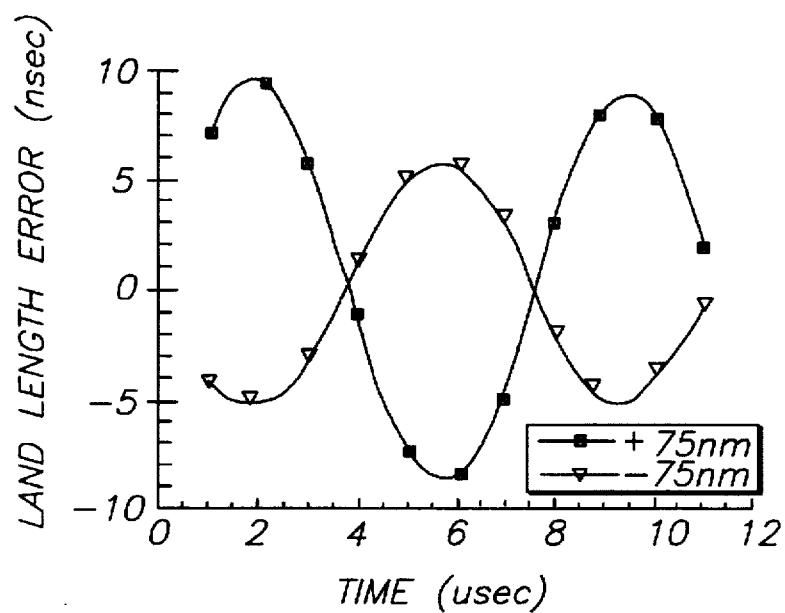

The MFE signal generated by the signal generator 32 will exhibit wobble-induced modulation when the recording beam is off-track relative to the groove centerline as described above in conjunction with FIG. 1. The modulation of the MFE signal will generally follow the characteristic shown in FIGS. 2(a) and 2(b) because the variation in mark length will produce corresponding variations in the reflected write signal pulses. The MFE signal will thus include one or more signal components at or near the fundamental wobble frequency when the incident beam goes off-track in the manner described previously. The present invention utilizes these wobble frequency signal components to provide laser power control which compensates for the wobble-induced mark length variation.

Figure 4A:
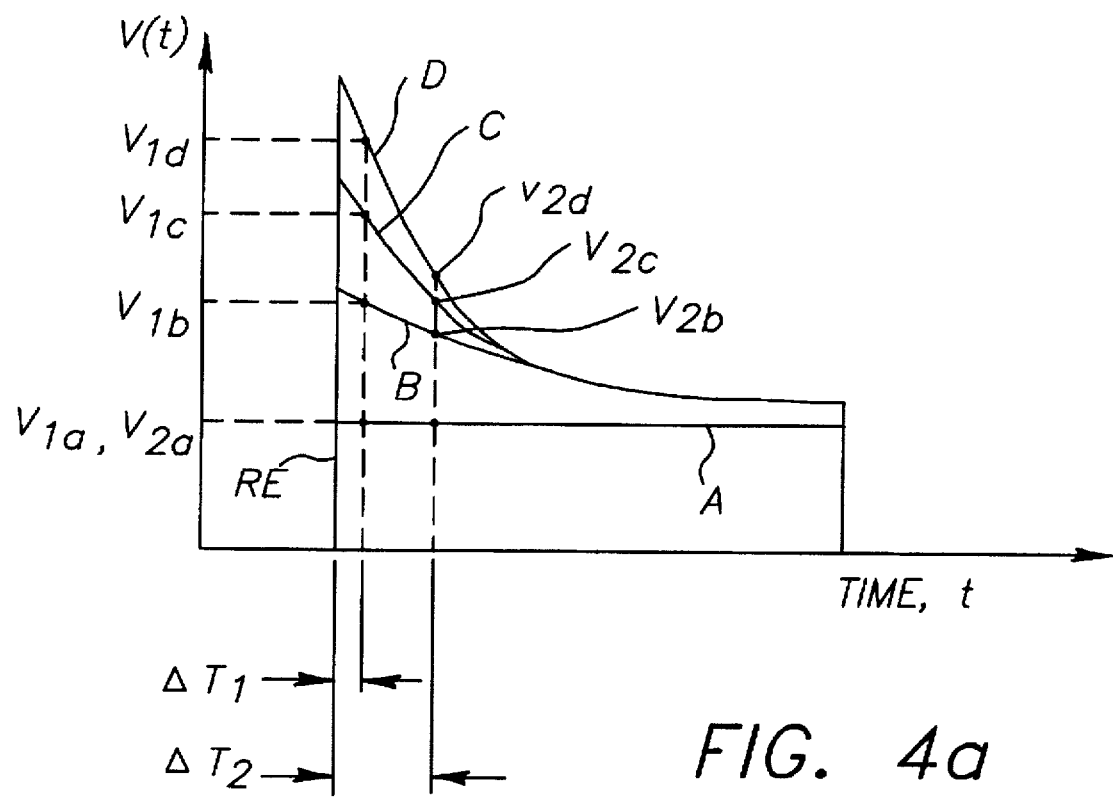
FIGS. 4(a) and 4(b) illustrate an exemplary reflected write pulse characteristic suitable for use as an MFE signal in accordance with the present invention.

Exemplary MFE signals suitable for use with the present invention will now be described in greater detail. FIG. 4(a) shows several superimposed reflected write pulses with different decay rates. The exemplary reflected write pulses A, B, C and D correspond to electrical signals, and are therefore shown in terms of voltage as a function of time. For illustrative purposes, only the portions of the pulses above a nominal read power level are shown. The reflected write pulses A, B, C and D in FIG. 4(a) each result from an incident write pulse at a different write power level, with the incident write power level generally increasing from a level insufficient to form a mark, corresponding to reflected pulse A, to a level above an optimal mark formation power level, corresponding to reflected pulse D. The reflected pulse C is assumed to correspond to an optimal incident write power in this example. Because no mark is formed by the incident write pulse giving rise to reflected write pulse A, there is no change in the reflectivity of the medium, and therefore the reflected pulse amplitude remains constant for the duration of the incident pulse. The peak voltages and decay rates for each of the reflected pulses B, C and D are different because each pulse is a reflection of an incident write pulse at a different power level.

Figure 4B:
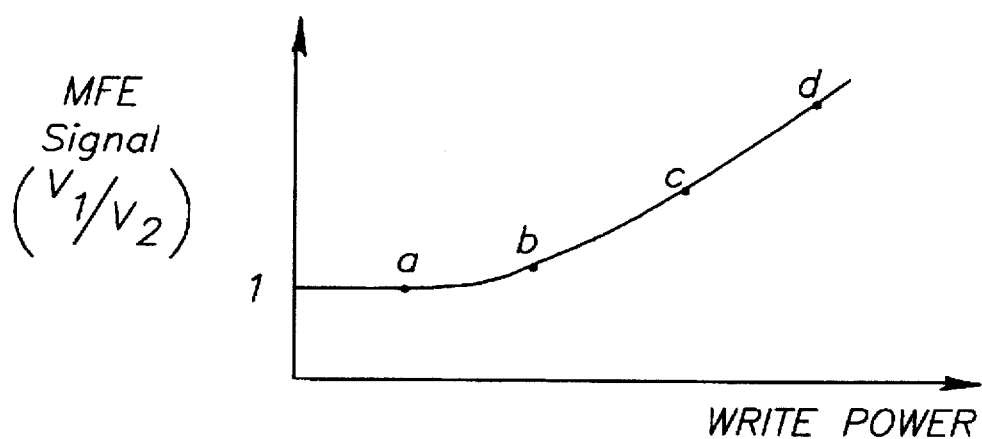

FIG. 4(b) shows a number of exemplary MFE signals corresponding to plotted points a, b, c and d. The MFE signal values a, b, c and d represent estimated normalized decay rates for the decaying portion of each of the four reflected write pulses of FIG. 4(a). By dividing a first reflected pulse voltage by a second reflected pulse voltage to estimate a decay rate, the MFE signal is normalized to the reflected pulse, and therefore insensitive to media contamination and other imperfections which alter the reflected signal magnitude. The MFE signal value for the reflected pulse A is computed by dividing a first voltage $V_{1a}$ by a second voltage $V_{2a}$, as shown in FIG. 4(a). In this embodiment, the first and second voltages are measured at a first and a second predetermined time, $DT_1$ and $DT_2$, respectively, after the rising edge RE of the corresponding reflected pulse. The MFE signal value for pulse A is one. It should be noted that an MFE signal value of zero, equivalent to the actual decay rate, could be obtained for pulse A by using a linear transformation of the quotient $V_{1a}/V_{2a}$. However, an MFE signal value of one for an actual decay rate of zero provides a reliable indication that no mark has been formed, while properly formed marks have MFE signal values significantly greater than one.

The second exemplary reflected pulse B corresponds to an incident write pulse power level greater than that of pulse A, but below the optimal write power level corresponding to pulse C. The incident power level which gives rise to reflected pulse B causes some change in the reflectivity of the medium, but may be insufficient to properly form a mark. An estimated normalized decay rate corresponding to point b in FIG. 4(b) may be determined by measuring the quotient $V_{1b}/V_{2b}$. As noted above, the third reflected pulse C results from an incident pulse at an optimal write power. An estimated normalized decay rate corresponding to point c in FIG. 4(b) is determined for pulse C by dividing the voltages $V_{1c}$ and $V_{2c}$. Although these two voltage are measured at the same predetermined time points, $DT_1$ and $DT_2$, used to estimate normalized decay rates for pulses A and B, the quotient of the voltages is larger because reflected pulse C has a faster normalized decay rate. The fourth pulse D corresponds to an incident write pulse power level above the optimal write power level. An estimated normalized decay rate corresponding to point d in FIG. 4(b) is determined for the reflected pulse D by measuring the quotient $V_{1d}/V_{2d}$. The normalized decay rate d is faster than the decay rates a, b and c of the exemplary pulses A, B and C. With the incident write pulse power level corresponding to reflected pulse D, a mark is formed very rapidly on the recording medium, and the change in reflectivity is also rapid, resulting in a faster normalized decay rate.

In the example of FIG. 4(b), the MFE signal values of the reflected pulses increase as a function of increasing incident write signal power. The plotted points a, b, c, and d correspond to the estimated normalized decay rates of the reflected signal pulses A, B, C and D, respectively, and are arranged in order of increasing incident write signal power. With increasing incident write signal power, the estimated normalized decay rate increases, indicating an increase in the rate at which a mark is formed on the optical medium. As noted above, the normalized decay rates can be used as an indication as to whether the corresponding marks have been formed at the optimal power level.

Alternative MFE signals include, for example, linear or non-linear transformations of the quotient $V_1/V_2$, or an integral of the area under the reflected pulse from the pulse rising edge RE to a predetermined time after the rising edge, normalized to a measured point on the waveform. Additional detail on these and other MFE signals may be found in the above-cited U.S. patent application Ser. No. 08/179,472. It should be noted that the term "MFE signal" as used herein includes not only DRDW signals such as those described in conjunction with FIGS. 4(a) and 4(b), but also direct-read-after-write (DRAW) signals which characterize a portion of a reflected write signal after a falling edge of a given pulse.

Referring again to FIGS. 3(a) and 3(b), the MFE signal generator 32 supplies an output MFE signal to a low pass filter 33. An output MFE signal value may also be sampled by a processor (not shown) and stored in a system memory (not shown). The low pass filter 33 is designed to pass MFE signal components corresponding to degradations typically compensated in laser power control servo loops. These degradations as described in U.S. Pat. No. 5,446,716 include "high frequency" degradations such as AC laser focus error, which may be caused by shock and vibration, and tilt, which may be caused by non-flat media or skewed mounting of media on a spindle, and "low frequency" degradations such as variations in sensitivity along the surface of an optical medium and changes in laser wavelength with temperature combined with a medium in which sensitivity varies with wavelength. It should be understood that the terms "high frequency" and "low frequency" used in U.S. Pat. No. 5,446,716 distinguish between these two different types of system degradations and their corresponding power control servos, and that both of these types of degradations generally exhibit frequencies which are substantially below the groove wobble frequencies addressed by the present invention.

The LPF 33 will typically pass MFE signal components below about 5 kHz while blocking components such as the 1× fundamental wobble frequency of 22.05 kHz. For purposes of the present description, the MFE signal components corresponding to system degradations typically compensated by prior art laser power control servos will be collectively referred to as "low frequency" components, while the MFE signal components corresponding to wobble-induced variations will be referred to as "wobble frequency" components. The wobble frequency components will be separately filtered, gain and phase adjusted and then recombined with the low frequency components in a manner to be described in greater detail below.

The output of the low pass filter 33 is supplied to a signal combiner 34 which measures the difference between an actual MFE signal value and an optimal, or target, MFE signal value stored in the system memory (not shown). The difference between the actual and the target MFE signal values will be referred to herein as the MFE error signal. A target MFE value may be determined as part of a laser power calibration process in which practice data recordings are made in one section of the recording medium. The MFE signal values corresponding to various trial write power levels may be stored in memory, and the target value determined from the MFE signal values for the different trial power levels and corresponding measurements of resulting data quality.

The MFE error signal from signal combiner 34 passes through a voltage limiter 40. The voltage limiter 40 limits the contribution to total laser output power from the MFE error signal feedback. In general, a maximum value, or limit, for the MFE error signal may be stored within the system memory and supplied to the limiter as shown in FIGS. 3(a) and 3(b). The output of the limiter 40 is a voltage-limited MFE error signal which will not exceed the stored maximum value. As a result, the laser peak output power will not be driven above a recommended maximum by the fed-back MFE error signal. An exemplary limiter circuit suitable for use in the present invention is described in the above-cited U.S. Pat. No. 5,436,880. The output of voltage limiter 40 is supplied to a signal combiner 42.

The wobble frequency components of the MFE signal from generator 32 are processed in the following manner. The MFE signal is first applied to a band pass filter 50 which passes the wobble frequency components. These components will generally include, for example, the fundamental wobble frequency which is 22.05 kHz for a system operating at a 1× write speed and six times higher or 132.30 kHz for a 6× system. The components may also include modulation on the fundamental wobble frequency. This modulation may be, for example, FM modulation at plus/minus ten percent corresponding to the above-described ATIP information. The pass band of filter 50 could be designed to pass harmonics of the fundamental wobble frequency in addition to or in place of the fundamental. An exemplary 3 dB bandwidth of about 8 kHz at a write speed of 1× would allow passage of the usual FM wobble modulation. Alternatives to the band pass filter 50 include other analog or digital filtering devices capable of isolating the desired wobble frequency components of the MFE signal.

The filtered wobble frequency components are then phase adjusted in element 52 and amplitude adjusted in gain adjust element 54. The phase adjust 52 provides a suitable time delay to compensate for differences in the servo loop phase response at the wobble frequencies as compared to the low frequencies. The phase adjustment also compensates for any time delays caused by band pass filter 50. Phase adjust element 52 may be an analog or digital delay line. The delay line may provide a programmable delay selectable in various increments, or a fixed amount of delay determined during an initial system calibration. The gain adjust 54 may be, for example, a variable gain amplifier or a variable attenuator, and is used to compensate for differences in the servo loop amplitude response at the wobble frequencies as compared to the low frequencies. The filtered and phase/gain adjusted wobble frequency components of the MFE signal are then applied to signal combiner 42 and thereby recombined with the low frequency components of the MFE signal.

The recombined signal is processed through a variable gain stage 60, a fixed gain stage 62, and a loop switch 64 to provide partial or full correction of MFE error in the manner described in the above-cited U.S. Pat. No. 5,436,880. Although partial correction of MFE error may be preferable in the system of FIGS. 3(a) and 3(b) for the reasons identified in U.S. Pat. No. 5,436,880, it should be understood that the present invention may be implemented in systems which provide full correction of MFE error or full correction for certain degradations and partial correction for others in the manner disclosed in the above-cited U.S. Pat. No. 5,446,716.

The variable gain stage 60 may be a multiplying digital-to-analog converter (DAC) configured in a known manner to operate as a variable attenuator. An exemplary multiplying DAC is the Model AD7628 DAC available from Analog Devices. Other types of variable attenuators may also be used for the variable gain stage 60. As another alternative, the fixed gain stage 62 may be eliminated, and the entire loop gain supplied by the variable gain stage 60. In general, the variable gain stage 60 and the fixed gain stage 62 together provide a variable loop gain for the MFE error signal feedback servo loop. The appropriate loop gain value will typically vary depending upon, for example, the type of system degradations to be compensated. The loop switch 64 is typically in an open position during, for example, write power level calibration. The loop switch 64 is placed in a closed position during normal system operation such that laser power is controlled in accordance with the fed-back low frequency and wobble frequency components of the MFE signal.

The write power for the optical source 11 is determined in part by a write control voltage generated by a write power digital-to-analog convertor (DAC) 66. The write power DAC controls a write laser driver 70 via signal combiner 68. The output of the write laser driver 70 is provided to optical source 11, along with the output of a read laser driver 74 generated in response to a read control voltage from a read power DAC 72. Both the write power and read power DACS 66, 72, respectively, may be controlled by a system processor (not shown) using, for example, write and read control voltage values stored in the system memory (not shown). A nominal write control voltage value is typically determined during write calibration, and an appropriate read control voltage value may be determined by, for example, sampling the FFM 30 between write pulses.

When loop switch 64 is closed during normal system operation, the laser read and write power levels are controlled by the low frequency and wobble frequency components of the fed-back MFE signal. The recombined, MFE signal is scaled by the variable system loop gain provided by variable gain stage 60 in combination with fixed gain stage 62, and is supplied to the signal combiner 68. The signal combiner 68 corrects the voltage generated by write power DAC 66 using the scaled MFE signal, and the corrected voltage value is used to control the write laser driver 70. The write laser driver 70 then supplies an electrical signal to optical source 11 which is a function of the sum of the write DAC control voltage and the scaled MFE signal. The servo loop of FIGS. 3(a) and 3(b) provides and exemplary feedback circuit operative to produce changes in the optical source write power level which tend to reduce both the MFE error signal and variations in the wobble frequency components of the MFE signal. The feedback circuits of the present invention may be completely or partially implemented in software. The software may be executed using a computer, microprocessor, application-specific integrated circuit (ASIC) or other digital data processor within the optical recording system. As noted above, the processor could be suitably connected to control the variable gain stages, the write and read power DACS, the combiners 34, 42 and 68, and the limiter 40, as well as other system elements.

Separating the signal paths for the low frequency and wobble frequency components of the MFE signal as shown in FIGS. 3(a) and 3(b) provides a number of advantages. For example, the separation permits the use of an MFE signal generator with a non-flat amplitude response and non-zero phase response from DC to the wobble frequency, because separate gain and phase adjustments can then be provided for the wobble frequency components. Also, the use of a band pass filter to isolate the wobble frequency components can provide improved signal-to-noise performance in the power control servo loop.

Figure 5A:
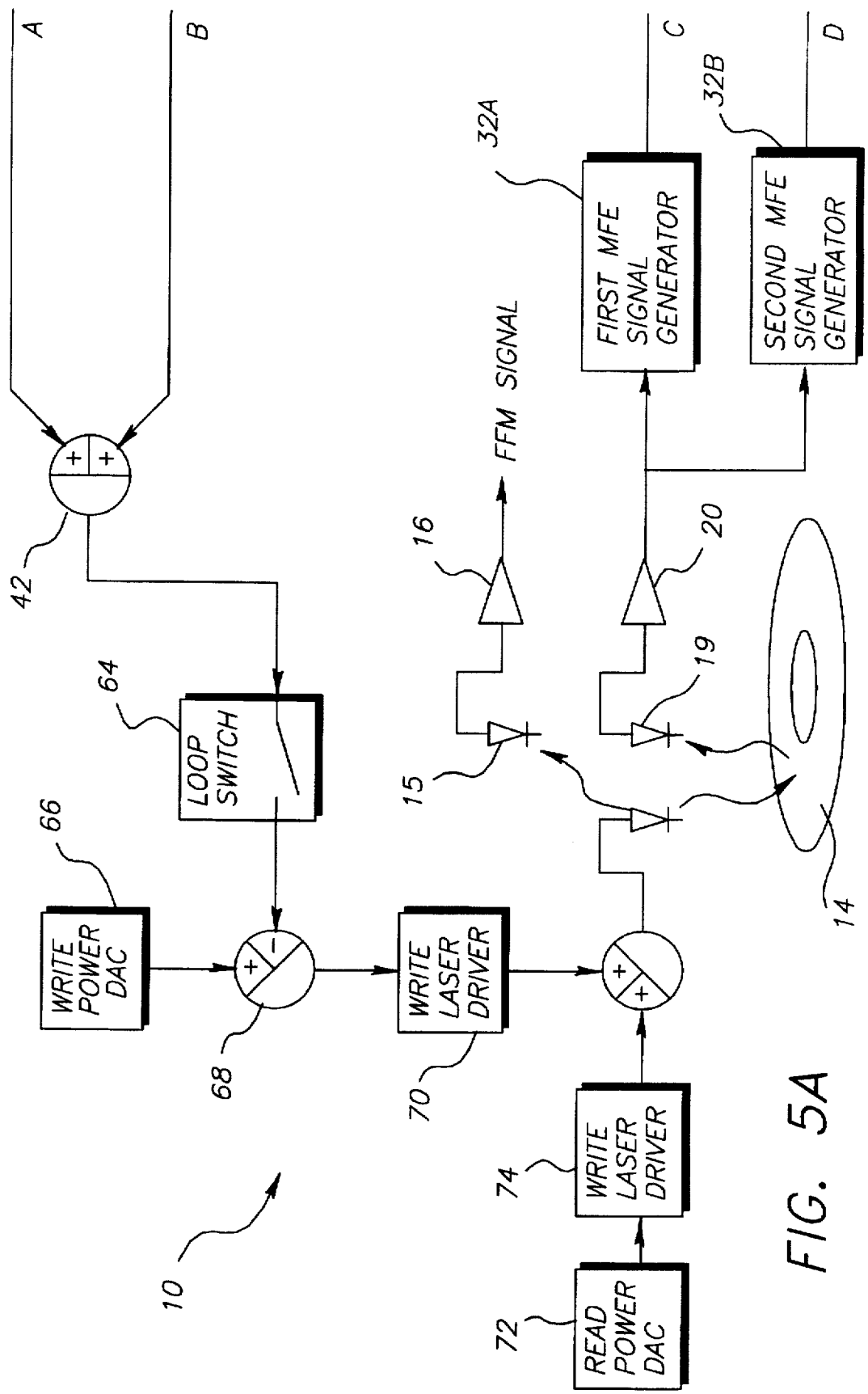
FIGS. 5(a) and 5(b), when taken together are a block diagram of a second embodiment of the present invention in which separate MFE signal generators are used for wobble frequency laser power control and low frequency laser power control.
Figure 5B:
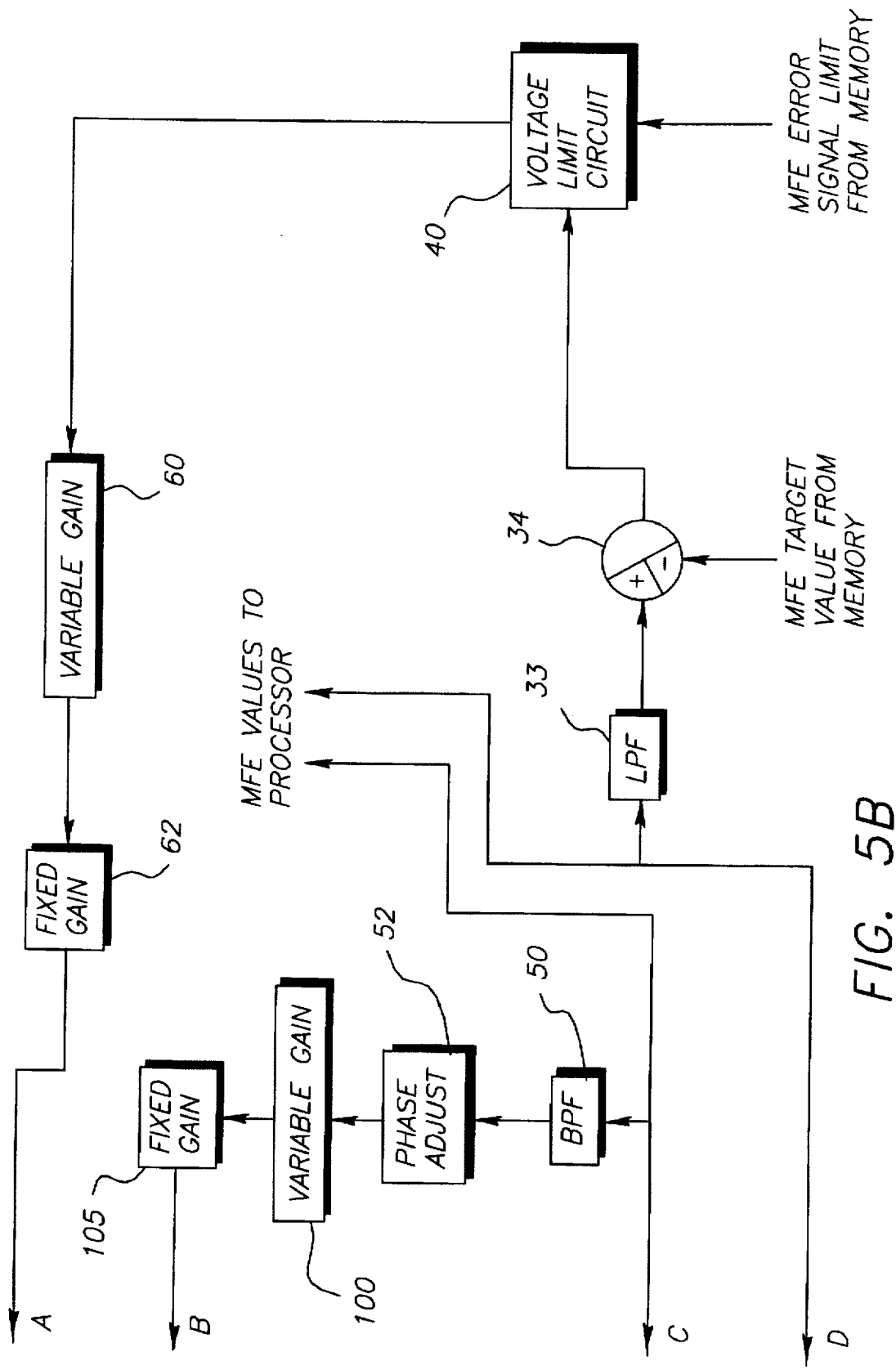

FIGS. 5(a) and 5(b), when taken together, show an alternative embodiment of the optical recording system 10 in which separate MFE signal generators are used for the low frequency compensation and the wobble frequency compensation. A first MFE generator 32A provides a first MFE signal which is used to provide the wobble frequency components for laser power control. The first MFE signal is band pass filtered in filter 50, and phase adjusted in element 52. A variable gain element 100 is used to adjust the wobble component loop gain in conjunction with a fixed gain stage 105. Like the variable gain element 60 of FIGS. 3(a) and 3(b), and 5(a) and 5(b), the variable gain element 100 may be, for example, a multiplying DAC controlled by a system computer or other processor. A particular sampled value of the first MFE signal may be provided to the processor as indicated in FIGS. 5(a) and 5(b).

A second MFE signal generator 32B generates a second MFE signal which is provided to LPF 33 and used to supply the low frequency components for laser power control. A sampled value of the second MFE signal may be provided to the system processor as indicated in FIGS. 5(a) and 5(b). The second MFE signal is processed to generate an MFE error signal in the manner previously described, and the error signal is then voltage limited in limiter 40 and passed through gain stages 60 and 62 to set the loop gain for the low frequency components. The wobble frequency and low frequency components are then combined in signal combiner 42, and further processed in the manner described above in conjunction with FIGS. 3(a) and 3(b). In the embodiment of FIGS. 5(a) and 5(b), the two MFE signal paths of the servo loop feedback circuit can be separately optimized for the low frequency and wobble frequency components. For example, the two paths have separate variable gain stages 60, 100 which may be individually adjusted during a write calibration procedure to determine optimal settings.

Another alternative embodiment of the invention could utilize a single MFE signal generator and a single loop feedback path for both low frequency and wobble frequency components. Such an embodiment could be configured as in the embodiment of FIGS. 3(a) and 3(b) but with the LPF 33, BPF 50, phase adjust 52, gain adjust 54 and signal combiner 42 eliminated. This alternative embodiment requires that the MFE signal generator and other loop feedback circuitry exhibit a substantially flat amplitude response with substantially no phase variation over a frequency range which includes both the low frequency and wobble frequency components. In addition, the MFE generator and feedback circuitry should provide a sufficiently high signal-to-noise response such that a band pass filter at the wobble frequency is unnecessary. Although this embodiment simplifies the feedback circuit of the servo loop it may be difficult to generate an MFE signal with the desired amplitude, phase and noise characteristics.

A further alternative embodiment could provide laser power control using only the wobble frequency components of the MFE signal. Such an embodiment could be configured as shown in FIGS. 3(a) and 3(b) but with the LPF 33, signal combiner 34, voltage limiter 40 and signal combiner 42 eliminated. Other techniques could then be used to provide compensation for the system degradations giving rise to variation in the MFE low frequency components.

It should be emphasized that the embodiments described above are exemplary only. Many variations may be made in the arrangements shown, including, for example, the type of MFE signal used, the wobble frequency components used for compensating wobble-induced mark length variation, the manner in which the wobble frequency components are processed, and the manner in which the low frequency components are processed. These and other alternatives and variations will be readily apparent to those skilled in the art.

| PARTS LIST | |
|---|---|
| 10 | optical recording system |
| 11 | optical source |
| 14 | optical recording medium |
| 15 | front facet monitor (FFM) |
| 16 | preamplifier |
| 19 | optical detector |
| 20 | preamplifier |
| 32 | MFE signal generator |
| 33 | low pass filter |
| 34 | signal combiner |
| 40 | voltage limiter |
| 42 | signal combiner |
| 50 | band pass filter |
| 52 | phase adjust element |
| 54 | gain adjust element |
| 60 | variable gain stage |
| 62 | fixed gain stage |
| 64 | loop switch |
| 66 | write power DAC |
| 68 | signal combiner |
| 70 | write laser driver |
| 72 | read power DAC |
| 74 | read laser driver |
| 100 | variable gain stage |
| 105 | fixed gain stage |
| A, B, C, D | reflected write pulses |
| a, b, c, d | MFE signal values |
| CL | groove centerline |
| G | groove |
| L | mark length |
| M1, M2, M3 | marks |
| RE | reflected pulse rising edge |
| S1 | recording spot |
| $DT_1$ | first predetermined time |
| $DT_2$ | second predetermined time |
| $V_{1a}, V_{1b}, V_{1c}, V_{1d}$ | first reflected pulse voltage |
| $V_{2a}, V_{2b}, V_{2a}, V_{2d}$ | second reflected pulse voltage |

We claim:

1. An apparatus for use in an optical recording system, the system including an optical source which provides an incident write signal for recording data in the form of optically-detectable marks on a medium having a wobbled groove, the apparatus comprising:

a detector arranged in an optical path of a reflection of said incident write signal from said medium and adapted to generate a reflected write signal including at least one reflected write pulse corresponding to a portion of said data;

a signal generator connected to said detector and adapted to generate from said at least one reflected write pulse a mark formation effectiveness (MFE) signal indicative of formation of the corresponding mark on said medium; and a feedback circuit connected between said signal generator and said optical source for controlling a power level of said source in accordance with MFE signal variations produced by said wobbled groove, said feedback circuit further including a band pass filter adapted to pass components of said MFE signal in a frequency range centered about said wobbled groove frequency.

2. An apparatus for use in an optical recording system, the system including an optical source which provides an incident write signal for recording data in the form of optically-detectable marks on a medium having a wobbled groove, the apparatus comprising:

a detector arranged in an optical path of a reflection of said incident write signal from said medium and adapted to generate a reflected write signal including at least one reflected write pulse corresponding to a portion of said data;

a signal generator connected to said detector and adapted to generate from said at least one reflected write pulse a mark formation effectiveness (MFE) signal indicative of formation of the corresponding mark on said medium; said signal generator further adapted to exhibit substantially no amplitude and phase variation for a range of frequencies including both a low frequency component and a wobble frequency component of said MFE signal; and a feedback circuit connected between said signal generator and said optical source for controlling a power level of said source in accordance with MFE signal variations produced by said wobbled groove.

3. An apparatus for use in an optical recording system, the system including an optical source which provides an incident write signal for recording data in the form of optically-detectable marks on a medium having a wobbled groove, the apparatus comprising:

a detector arranged in an optical path of a reflection of said incident write signal from said medium and adapted to generate a reflected write signal including at least one reflected write pulse corresponding to a portion of said data;

first and second signal generators connected to said detector and adapted to generate from said at least one reflected write pulse first and second mark formation effectiveness (MFE) signals, respectively, indicative of formation of the corresponding mark on said medium; and a feedback circuit connected between said first and second signal generators and said optical source for processing a wobble frequency component of said first MFE signal to correct said source power level for wobble-induced variations in said first MFE signal and a low frequency component of said second MFE signal to correct said source power level for system degradation-induced variations in said second MFE signal.

4. An apparatus for use in an optical recording system, the system including an optical source which provides an incident write signal for recording data in the form of optically-detectable marks on a medium having a wobbled groove, the apparatus comprising:

a detector arranged in an optical path of a reflection of said incident write signal from said medium and adapted to generate a reflected write signal including at least one reflected write pulse corresponding to a portion of said data;

a signal generator connected to said detector and adapted to generate from said at least one reflected write pulse a mark formation effectiveness (MFE) signal indicative of formation of the corresponding mark on said medium; and a feedback circuit connected between said signal generator and said optical source for controlling a power level of said source in accordance with MFE signal variations produced by said wobbled groove, said feedback circuit further including means for defining a first signal path for processing a wobble frequency component of said MFE signal and means for defining a second signal path for processing a low frequency component of said MFE signal.

5. The apparatus of claim 4 wherein said first signal path includes:

a band pass filter suitable for passing a component of said MFE signal at a fundamental wobble frequency of said groove; and phase and amplitude adjustment elements connected to said band pass filter and adapted to provide adjustments in a phase and amplitude of said MFE signal component at said fundamental wobble frequency.

6. The apparatus of claim 4 wherein said second signal path further includes:

a low pass filter connected to said signal generator and having a cut-off frequency below a wobble frequency of said wobbled groove such that said filter passes said low frequency component; and a signal combiner connected to said low pass filter and operative to combine said low frequency component of said MFE signal with a target value of said MFE signal to thereby provide an MFE error signal.

7. The apparatus of claim 4 wherein said feedback circuit further includes a signal combiner connected to outputs of said first and said second signal paths for combining said separately-processed low frequency and wobble frequency components of said MFE signal before said components are utilized to control a power level of said source.

8. A method for use in an optical recording system, the system including an optical source which provides an incident write signal for recording data in the form of optically-detectable marks on a medium having a wobbled groove, the method comprising the steps of:

detecting a reflection of said incident write signal from said medium to generate a reflected write signal including at least one reflected write pulse corresponding to a portion of said data;

generating from said at least one reflected write pulse a mark formation effectiveness (MFE) signal indicative of formation of the corresponding mark on said medium;

band pass filtering said MFE signal to pass components thereof in a frequency range centered about said wobbled groove frequency; and controlling a power level of said source in accordance with MFE signal variations produced by said wobbled groove.

9. A method for use in an optical recording system, the system including an optical source which provides an incident write signal for recording data in the form of optically-detectable marks on a medium having a wobbled groove, the method comprising the steps of:

detecting a reflection of said incident write signal from said medium to generate a reflected write signal including at least one reflected write pulse corresponding to a portion of said data;

generating from said at least one reflected write pulse a mark formation effectiveness (MFE) signal indicative of formation of the corresponding mark on said medium by a signal generator which exhibits substantially no amplitude and phase variation for a range of frequencies including both a low frequency component and a wobble frequency component of said MFE signal; and controlling a power level of said source in accordance with MFE signal variations produced by said wobbled groove.

10. A method for use in an optical recording system, the system including an optical source which provides an incident write signal for recording data in the form of optically-detectable marks on a medium having a wobbled groove, the method comprising the steps of:

detecting a reflection of said incident write signal from said medium to generate a reflected write signal including at least one reflected write pulse corresponding to a portion of said data;

generating from said at least one reflected write pulse first and second mark formation effectiveness (MFE) signals indicative of formation of the corresponding mark on said medium;

processing a wobble frequency component of said first MFE signal to correct said source power level for wobble-induced variations in said first MFE signal; and processing a low frequency component of said second MFE signal to correct said source power level for system, degradation-induced variations in said second MFE signal.

11. A method for use in an optical recording system, the system including an optical source which provides an incident write signal for recording data in the form of optically-detectable marks on a medium having a wobbled groove, the method comprising the steps of:

detecting a reflection of said incident write signal from said medium to generate a reflected write signal including at least one reflected write pulse corresponding to a portion of said data;

generating from said at least one reflected write pulse a mark formation effectiveness (MFE) signal indicative of formation of the corresponding mark on said medium; and controlling a power level of said source by processing a wobble frequency component of said MFE signal in a first signal path and a low frequency component of said MFE signal in a second signal path.

12. The method of claim 11 wherein said step of processing said low frequency component further includes:

filtering said MFE signal in a low pass filter having a cut-off frequency below a wobble frequency of said wobbled groove to thereby provide said low frequency component; and combining said low frequency component of said MFE signal with a target value of said MFE signal to thereby provide an MFE error signal.

13. The method of claim 11 wherein said step of controlling a power level further includes combining said separately-processed low frequency and wobble frequency components of said MFE signal before said components are utilized to control a power level of said source.

14. The method of claim 11 wherein said step of processing a wobble frequency component further includes:

filtering said MFE signal to pass a component of said MFE signal at a fundamental wobble frequency of said groove; and adjusting a phase and amplitude of said MFE signal component at said fundamental wobble frequency.

* * * * *